Oct. 27, 1953 W. T. WINTRINGHAM 2,657,256

COLOR TELEVISION SYSTEM

Filed May 20, 1950 8 Sheets-Sheet 1

INVENTOR
W. T. WINTRINGHAM
BY Hugh S. Wertz
ATTORNEY

INVENTOR
W. T. WINTRINGHAM
BY
Hugh S. Wertz
ATTORNEY

INVENTOR
W. T. WINTRINGHAM
BY
Hugh S. Wertz
ATTORNEY

INVENTOR
W. T. WINTRINGHAM
BY Hugh S. Wertz
ATTORNEY

Oct. 27, 1953 W. T. WINTRINGHAM 2,657,256

COLOR TELEVISION SYSTEM

Filed May 20, 1950 8 Sheets-Sheet 5

INVENTOR
W. T. WINTRINGHAM
BY Hugh S. Wertz
ATTORNEY

INVENTOR
W. T. WINTRINGHAM
BY Hugh S. Wertz
ATTORNEY

INVENTOR
W. T. WINTRINGHAM
BY Hugh S. Wertz
ATTORNEY

Oct. 27, 1953 W. T. WINTRINGHAM 2,657,256

COLOR TELEVISION SYSTEM

Filed May 20, 1950 8 Sheets-Sheet 8

INVENTOR
W. T. WINTRINGHAM
BY Hugh S. Wertz
ATTORNEY

Patented Oct. 27, 1953 2,657,256

UNITED STATES PATENT OFFICE 2,657,256

COLOR TELEVISION SYSTEM

William T. Wintringham, Chatham, N. J., assignor to Bell Telephone Laboratories, Incorporated, New York, N. Y., a corporation of New York Application May 20, 1950, Serial No. 163,273

3 Claims. (Cl. 178—5.4)

This invention relates to television systems and more particularly to color television systems.

The present invention finds application both with color television transmission systems which are of the so-called "simultaneous" type where each of the three component color images are simultaneously analyzed and transmitted, and additionally it can be modified in a manner to be described for use with the so-called "sequential" type where there is a cyclic change between the three components of the color images transmitted.

It is an object of this invention to improve the reproduction of color images in such television systems and more particularly to increase the brilliance and fidelity of such reproduction by an approximation at the receiver of the spectral energy distribution of the object scene.

For proper understanding of the full scope of the present invention, resort is first necessary to a few principles of colorimetry. It has long been known that a normal observer can duplicate the effect of any color stimulus by mixing the light from three primary stimuli in the proper proportions. The numbers representing the amount of each of the primary stimuli needed to color-match the unknown color are known as the tristimulus values. However, in practice, no ternary set of real primaries can be found that will match all colors without employing negative amounts of at least one of the primaries. Therefore, if negative tristimulus values are to be avoided, the primaries to be used must be chosen outside the realm of real colors. The I. C. I. primaries X, Y, and Z which have been adopted by the International Commission on Illumination (I. C. I.) have this characteristic. All the spectrum colors are thereafter defined in terms of three tristimulus values or distribution coefficients $\bar{x}$, $\bar{y}$ and $\bar{z}$, each of which is a measure of the amount of the corresponding I. C. I. primary X, Y or Z required to color-match a unit quantity of radiant energy thereof. The evaluation of the quality of color or chromaticity is accomplished by defining three new quantities, x, y, and z derived from the tristimulus values and termed trichromatic coefficients or coordinates, in a manner that their sum is always unity. This latter characteristic permits the convenient representation of chromaticities on a two-dimensional diagram which is called a chromaticity or color diagram. A chromaticity diagram has the important property that if the chromaticity of two distinct colors be plotted, the resultant color of any additive mixture thereof, will always lie on a line connecting the two chromaticities. This also leads to the further property that if the chromaticities of three colors are plotted on a chromaticity diagram, any color whose chromaticity falls within the color triangle having for its vertices the three points plotted, can be formed by additive mixtures of the three colors. Moreover, it is a further characteristic that a color which is defined in terms of tristimulus values corresponding to one ternary set of primaries can be redefined, by means of a linear transformation, by new tristimulus values corresponding to other ternary sets of primaries. For a more complete discussion of colorimetric principles, reference is made to A. C. Hardy's "Handbook of Colorimetry" (1936) The Technology Press, Cambridge, Massachusetts.

If color television is to be considered a medium for color matching, instead of an entertainment medium, there is little question of the inadequacy of a three color system. Colorimetric considerations indicate that it is impossible to obtain three real primaries which can be combined in additive amounts to reproduce all colors of the visible spectrum. Moreover, considerations of this same kind emphasize the importance of an approximation to a spectral energy match as well as a color match if the observer differences are to be minimized, since a perfect physical match is impossible except by spectral energy reproduction.

However, it is impossible to reproduce distributions of spectral energy which are continuous in wavelength by any system or method known at present. Even division of the range of feasible wavelengths into bands sufficiently narrow that the eye cannot distinguish between any possible distribution within each band requires several hundred such bands. A color television system which requires several hundred channels for transmission is not feasible.

In my related application Serial No. 163,272, filed May 20, 1950, there are described systems for color matching by means of a plurality of selected primaries. In my related application Serial No. 163,271, filed May 20, 1950, there are described systems for increasing the brilliance of whites and near whites at the receiver. The present invention provides improvements thereover by utilization of an approximation of the spectral energy of the object scene at the receiver in addition to a color match.

To this end, the present invention employs a plurality of fundamental primaries which are highly saturated and these are combined in predetermined arrangements to provide series of less saturated "composite primaries." Thereafter colors of the object scene are matched by combinations which include these composite primaries whenever possible.

Accordingly, in a receiver in accordance with the present invention, there are utilized a plurality of light sources which serve as the fundamental primaries. Predetermined combinations of these light sources are arranged to serve as the composite primaries. For any specific color match, a particular ternary combination of fundamental and composite primaries which favors an additive match is used. In a preferred embodiment, the choice of white as a primary is made because, in addition to insuring the high brilliance of whites and near whites, it facilitates the unique selection of the most suitable ternary combination of primaries.

If the chromaticities of the available primaries at the television receiver are plotted on a chromaticity diagram, the three thereof for the optimum match are those nearest the color to be matched and whose chromaticities are vertices of a triangle including the chromaticity of that color.

For the practice of the present invention, there is also provided an electrical system which can determine in which of a given set of color triangles a particular color falls. Further means are provided for utilizing this selection to energize the associated light sources at the receiver.

This system can be used, in a direct fashion for multi-color television, by the use of a ternary set of color pick-ups associated with each color triangle available at the receiver, but this is not feasible since a separate transmission channel would be required for the control of each primary color.

Therefore, it is another feature of the present invention that although the receiver utilizes more than three color primaries in reproducing the color images of the object scene, only three-color video signals need be transmitted to the receiver so that three channels are sufficient in the camera pick-up. The necessary expansion is made possible by use of color coordinate transformers by means whereof the transmitted ternary set of color signals is transformed into a plurality of ternary sets of colorimetrically equivalent color signals. Selecting means make the necessary discrimination therebetween to obtain the highest fidelity match.

In a color television system in accordance with the invention, the aforementioned objects and features are realized and the principles described utilized by a system in which: a receiver unit receives the transmitted television signals and separates out the ternary sets of color components therefrom; a plurality of color coordinate transformers transform the single set of ternary signals into a plurality of ternary sets of colorimetrically equivalent color signals corresponding to color triangles formed by fundamental and composite primaries; electrical circuits thereafter automatically select therefrom the unique set for the optimum color match; and light sources associated with the selected set produce the desired color match.

The invention will be more fully understood by reference to the following more detailed description taken in connection with the accompanying drawings forming a part thereof in which.

Figure 1:
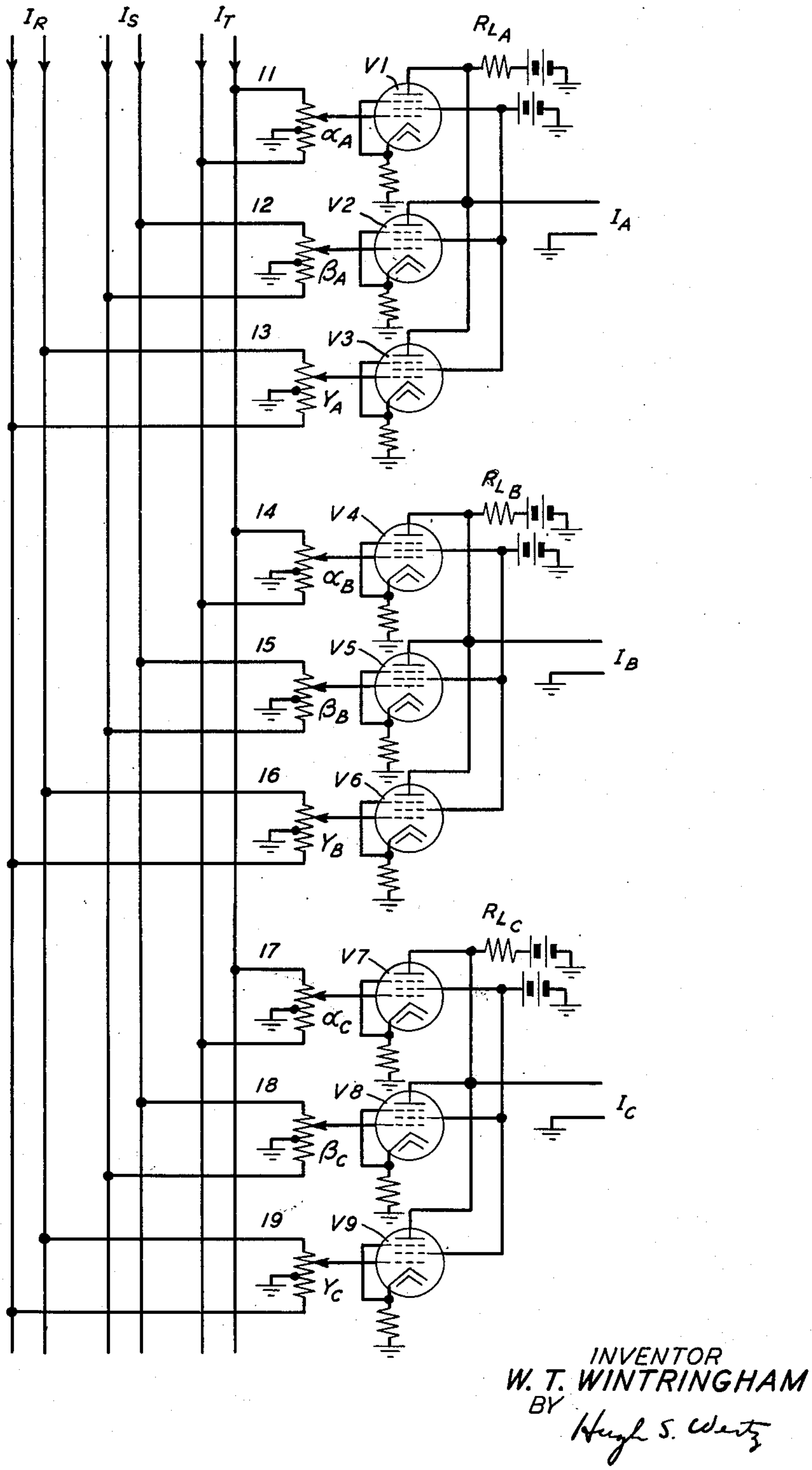
Fig. 1 shows an illustrative circuit arrangement for color coordinate transformation which is a feature of the present invention.

Fig. 1 shows diagrammatically an illustrative embodiment of an electrical arrangement for color coordinate transformation which can be used in the practice of the invention. As is well known in color work, when the three amplitudes of a ternary set of primaries matching a color are known, the three amplitudes of any other ternary set of primaries for a color match can be evaluated by a linear process. If $I_R$, $I_S$, and $I_T$ are a measure of the amounts of primaries R, S and T needed to match a color $C_1$ and A, B, and C are three other primaries with which it is sought to catch the color $C_1$, then the currents $I_A$, $I_B$, and $I_C$ to control these three primaries, respectively, are related to the values $I_R$, $I_S$, and $I_T$ by the linear equations:

$$I_A=k(\alpha_A I_R+\beta_A I_S+\gamma_A I_T) \quad (1)$$

$$I_B=k(\alpha_B I_R+\beta_B I_S+\gamma_B I_T \quad (2)$$

$$I_C=k(\alpha_C I_R+\beta_C I_S+\gamma_C I_T) \quad (3)$$

The constants $\alpha$, $\beta$, and $\gamma$ depend only on the colors of the new primaries A, B, and C, and are invariable once such primaries have been selected. An illustrative arrangement for performing this transformation of a color from the (R), (S), and (T) system to the (A), (B), and (C) system by electrical means is shown in Fig. 1. Each of the signals $I_R$, $I_S$, $I_T$, supply three potentiometers which are adjusted in accordance with the $\alpha$, $\beta$, and $\gamma$ coefficients of the linear Equations 1, 2 and 3. For example, the current $I_R$ supplies the three potentiometers 11, 14, and 17 which are adjusted to the coefficients $\alpha_A$, $\alpha_B$, and $\alpha_C$ of Equations 1, 2 and 3, respectively. Similarly, the currents $I_S$ and $I_T$ supply potentiometers 12, 15, 18 and 13, 16, 19, respectively, adjusted to corresponding $\beta$ and $\gamma$ coefficients. The voltages $\alpha_A I_R$, $\beta_A I_S$ and $\gamma_A I_T$, which are the three components of Equation 1, are supplied to the grids of three pentodes V1, V2, and V3, which are operated as conventional single-stage amplifiers. Addition of the three components in accordance with Equation 1 is effected through the use of a common load resistor $R_{L_A}$ for the three amplifier tubes V1, V2 and V3 to produce the current $I_A$. Similar sets of three amplifier tubes V4, V5 and V6, and V7, V8 and V9 operating into common load resistor $R_{L_B}$ and $R_{L_C}$, respectively, are used in accordance with Equations 2 and 3 to produce the currents $I_B$ and $I_C$. The arrangement above described is intended as an illustrative embodiment of the principle of color coordinate transformation. Other arrangements are similarly feasible for the transformation.

Figure 2:
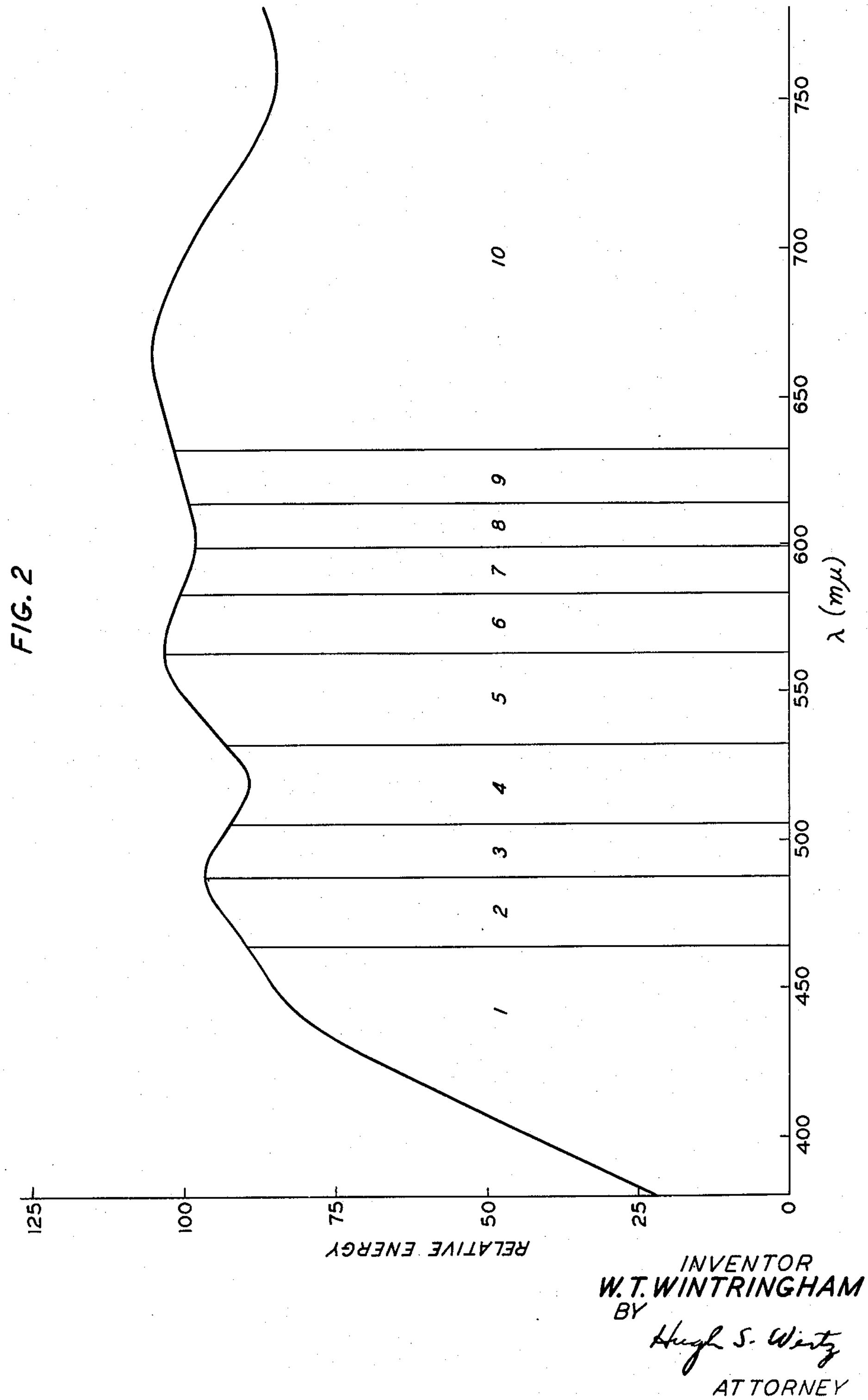
Fig. 2 is a curve showing the radiance distribution of a standard illuminant, which will be useful in explaining a feature of the invention.

The curve of Fig. 2 shows the relative radiance distribution of a typical standard illuminant, the I. C. I. Illuminant B. If the sum of the radiances of all the sources of a receiver approximated this curve, then this sum would appear white to an observer. In the construction of a preferred embodiment in accordance with the invention, it will be useful to start with such a white distribution and to carve it up to obtain desirable distributions for each of the fundamental primaries to be used. For the purposes of illustration, it has been assumed that the band can be divided rectilinearly as shown. In practice, the carving would be done with rounded characteristics of such shape that the sum at every wavelength equalled unity since the fundamental primaries should duplicate the radiance distributions carved from this total. Thereafter, fundamentals of such characteristics are obtained, in a manner known in the art, by phosphors filtered appropriately so that the distribution is made to vary with wavelength to approximate that desired. In an illustrative embodiment of a receiver, which will be described hereinafter, ten such fundamental primaries, corresponding to the ten carvings 1 through 10 shown here, are used. The number of carvings, and hence the number of light sources to be used, is determined by the compromise made between fidelity and complexity.

Figure 3:
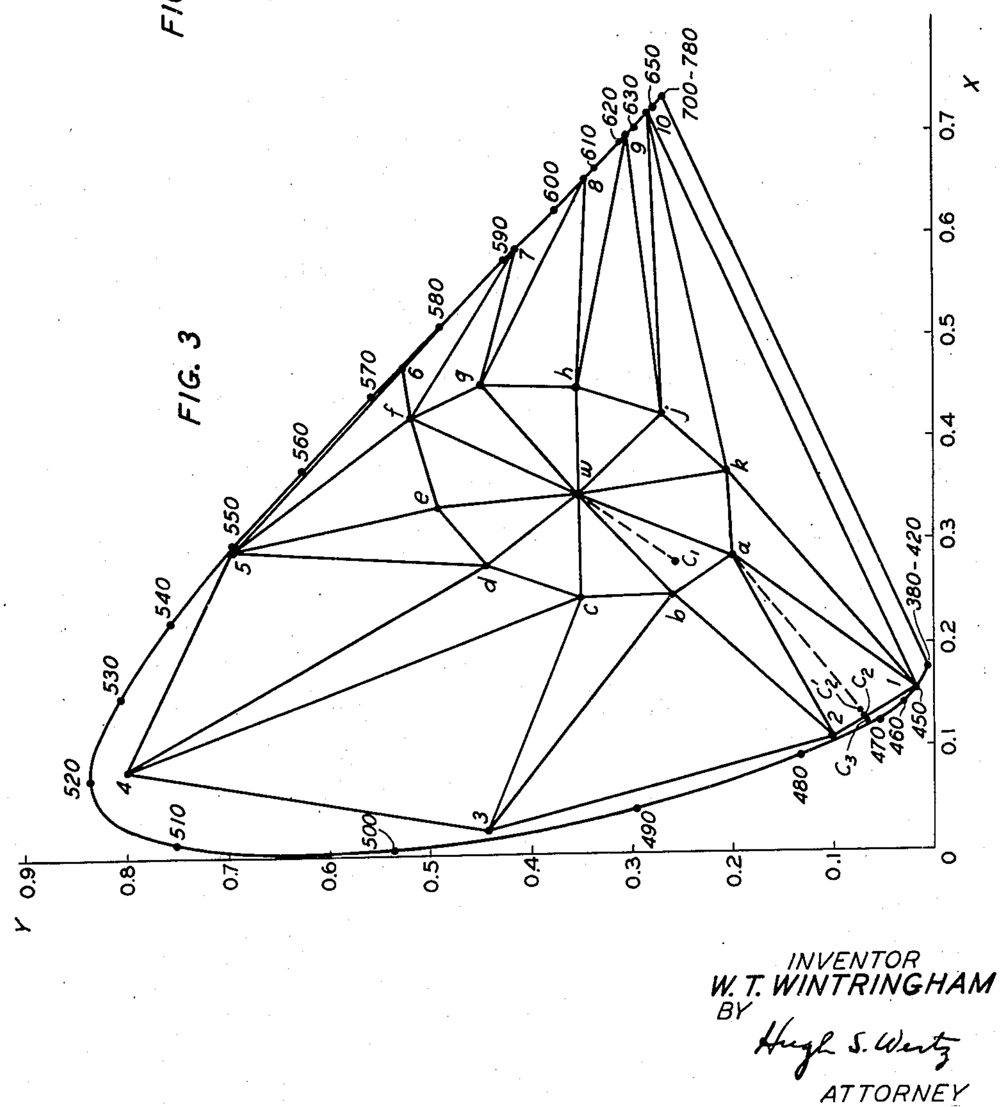
Fig. 3 is a chromaticity diagram which will be useful in describing the invention.

Fig. 3 is a chromaticity diagram. A chromaticity diagram has the useful property that if the chromaticity coordinates of three primaries be plotted thereon, any color whose coordinates lie within the triangle having for its vertices the three points plotted can be formed by an additive mixture of the three primaries, and also that any color whose coordinates are not so contained, cannot be so formed thereby, since it is impossible to provide physically a negative amount of light.

The chromaticities of each of the bands numbered from 1 to 10 in Fig. 2, representative of the ten fundamental primaries at the receiver, have been plotted and are numbered correspondingly. The chromaticity of the sum of all these fundamental primaries has also been plotted and is designated as $w$. This is identical to the chromaticity of Illuminant B which is a satisfactory white.

For highly saturated colors, it is possible to produce a radiance distribution by addition of two of the fundamental primaries and the white which will be like enough to that of the original color that good color matches result. For colors of intermediate saturation, however, the best radiance distribution possible by such a mixture will be that of white with spikes corresponding to the fundamentals mixed therewith, which will be different from the usual distributions of such unsaturated colors. It therefore becomes necessary to obtain further sets of less saturated primaries. The simplest way to obtain such primaries is by combining the fundamental primaries in any way that might seem desirable to provide composite primaries of low saturation. The chromaticities of one such set of composite primaries are plotted as $a$ to $k$, inclusive in Fig. 3.

These mixed primaries, in this illustrative case, are obtained as follows: primary $a$ represents the combination of one part of primary 1, 0.8 part of primaries 2 and 10, 0.6 part of primaries 3 and 9, 0.4 part of primaries 4 and 8, and 0.2 part of primaries 5 and 7. Each of the other composite primaries is obtained in a corresponding manner by mixing different amounts of fundamentals. Colors can be matched now by additive mixtures of any set of three primaries selected from those numbered from 1 to 10, lettered from $a$ to $k$, and $w$. To insure the optimum match, the three primaries should be chosen on the basis that their chromaticities should be nearest to and form a color triangle including the chromaticity of the color to be matched. It can be seen that a large number of triangles can be associated with each primary. It would seem that some compromise with this general rule is desirable in the interest of circuit simplicity.

One possible compromise is shown in the diagram of Fig. 3. In this case, each primary, both mixed and fundamental, is associated permanently with a limited number of specific triangles. The white primary $w$ is used in combination with adjacent pairs of mixed primaries. Each of the fundamental primaries 1 through 10 is grouped individually with one adjacent pair of mixed primaries, and adjacent pairs of fundamentals are combined with one mixed primary. In this way, every part of the figure whose vertices are the 10 fundamental primaries is associated exclusively with one of the plurality of triangles formed, whose vertices are the chromaticities of ternary sets of combinations of mixed and fundamental primaries.

For each triangle formed there is associated therewith, a color coordinate transformer of the kind hereinabove described. Each transformer converts the transmitted single ternary set of color signals into a colorimetrically equivalent ternary set of signals in terms of amounts of the associated primaries.

It is apparent that other color triangles can be formed in many other ways. The primary $w$ can be included in triangles formed with primaries both composite and fundamental. This however produces overlapping of triangles and necessitates special discriminating circuits to choose between several sets of possible selections for the optimum match.

In the case where the chromaticity coordinates of the color $C_1$, which is being transmitted, are within the triangle $w$—$a$—$b$, the three outputs from the color transformer associated therewith will all be positive since an additive match is possible. Moreover in each set of outputs associated with other transformers, at least one signal will be negative since a negative amount is necessary for a color match. The important fact here is that all three signals are positive only at the output of the color transformer corresponding to the triangle $w$—$a$—$b$ within which the color $C_1$ lies, and at least one signal is negative for each other triangle. This fact is utilized to select electrically the set for the optimum match.

Assume that the color $C_2$ having coordinates which fall within the triangle 1—2—$a$ and outside all the triangles having $w$ as a vertex is to be reproduced. Here the outputs of the corresponding transformer 1—2—$a$ will all be positive whereas at least one of the outputs for all the other transformers will be negative.

Still with reference to Fig. 3, suppose the color $C_3$ having coordinates which fall outside all the triangles corresponding to the sets of primaries available at the receiver is to be produced. Then at least one signal in all of the color transformers is negative since an additive match is impossible. In this special case, the electrical mechanism should be such that the two primaries 1 and 2 are turned on to produce the color $C_2'$ corresponding to zero amplitude of primary $a$. Therefore, it is necessary that the selecting circuits used for the triangles consisting of one composite and two fundamental primaries should not be controlled by the polarity of the mixed primary output. Since the light sources can never produce a negative output, the color match is unaffected by the negative signal except that the saturation of the resultant is slightly less than the original color. This can be reduced to within any desired tolerance by increasing the number and the saturation of the fundamentals used.

Figure 4:
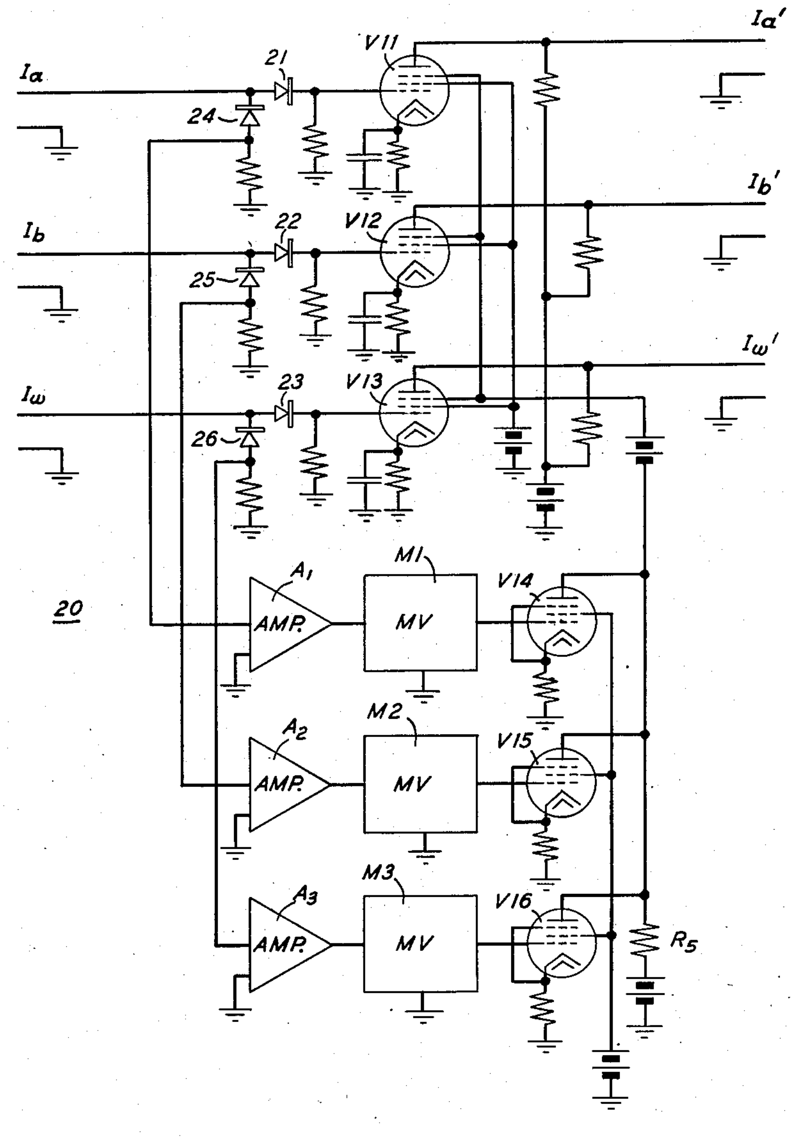
Figs. 4 and 5 show partly diagrammatically and partly in block schematic form illustrative selecting arrangements for use in the practice of the invention.

Fig. 4 illustrates partly in block schematic form and partly diagrammatically an illustrative arrangement of a disabling circuit 20 to select electrically the output of the particular color transformer that gives the best match, which the color to be matched falls within the figure whose vertices are the composite primaries or within triangles formed by one fundamental and two composite primaries. In accordance with the invention as is hereinbefore described, the color transformers each produce a ternary set of signals which is the colorimetric equivalent of the color being matched. However, the desired set is characterized by the fact that the three outputs associated therewith are all positive. The selecting circuit must automatically discriminate between the available sets by this characteristic. In the illustrative arrangement being described, a gating amplifier, with the gating control applied to the suppressor grid of a pentode tube, is inserted in each circuit associated with one of the three separate outputs of each color transformer. For the sake of illustration the ternary set $I_a$, $I_b$ and $I_w$ associated with color transformer for triangle *a—b—w* has been chosen. The gating amplifiers are shown as the pentodes V11, V12, and V13, whose control grids are supplied with signals $I_a$, $I_b$, and $I_w$, respectively. The pentodes V11, V12 and V13 are operated as gating amplifiers, in a manner well known to the art. Series rectifiers 21, 22, and 23, poled to pass only positive signals, are inserted in the input circuits of the three gating amplifiers V11, V12, and V13, respectively. The input signals $I_a$, $I_b$ and $I_w$ are also supplied to amplifiers A1, A2 and A3, respectively. The rectifiers 24, 25, and 26 are inserted in the input circuits of A1, A2 and A3, respectively, and are poled to pass only negative signals. The amplifiers A1, A2 and A3 can be of any conventional design adapted to receive negative input signals. The outputs of the amplifiers A1, A2 and A3 are supplied to multivibrator M1, M2 and M3, respectively. These multivibrators have one position of stability, and produce a sharp positive pulse when triggered by a negative input but return to a stable position immediately after the signal is removed. There are many arrangements known in the art for producing this desired effect. The multivibrators thereafter supply the input circuits of the isolating amplifiers V14, V15 and V16 which are pentodes operated for adding the outputs of the three multivibrators M1, M2 and M3 by means of a common load resistor R5 in the plate circuits. The negative control voltage which is developed at the common plate load R5 of tubes V14, V15 and V16 is applied to the suppressor grid of each of the tubes V11, V12 and V13 as a gating control.

The operation of this selecting circuit 20 is as follows. For the first case, suppose that the color $C_1$ shown in Fig. 2, whose coordinates lie within the color triangle *a—b—w* is to be reproduced. Then, as is described hereinbefore, the outputs $I_a$, $I_b$ and $I_w$ of the color transformer associated therewith are all positive. Since rectifiers 24, 25, and 26 are poled to pass only negative signals, the control circuits comprising the amplifiers A1, A2 and A3 are inoperative, since no signal is supplied thereto. Tubes V11, V12, and V13, in the absence of gating pulses on the suppressor grids thereof, function as conventional amplifiers to provide the output $I_a'$, $I_b'$, and $I_w'$ which are utilized to actuate associated light sources.

However, for all colors outside the triangle *a—b—w*, at least one of the outputs of the transformer associated therewith, is negative. For example, for the color $C_2$ which lies in the triangle 1—2—*a*, the output $I_w$ of the transformer associated with triangle *a—b—w* will be negative, since a negative amount of primary *w* is necessary to make a color match. This negative signal $I_w$ will be supplied through the rectifier 26 which is poled to pass negative signals to the amplifier A3 and the amplified output therefore, in turn, trips the multivibrator M3, which produces a positive step voltage therefrom which, after reversal by the amplifier V16, is supplied as a negative gating pulse to the suppressor grids of each of the gating amplifiers V11, V12, and V13 and keeps each unresponsive to all input signals so long as the output $I_w$ is negative. An arrangement of the kind described is associated with the outputs of each of the color transformers associated with triangles made up of two composite and the white primary, or two composite and a fundamental primary for selecting from colors included therein. The particular arrangement described is merely illustrative of the principles of the selecting means, one skilled in the art can easily devise others to achieve the desired disabling consistent with these principles.

Figure 5:
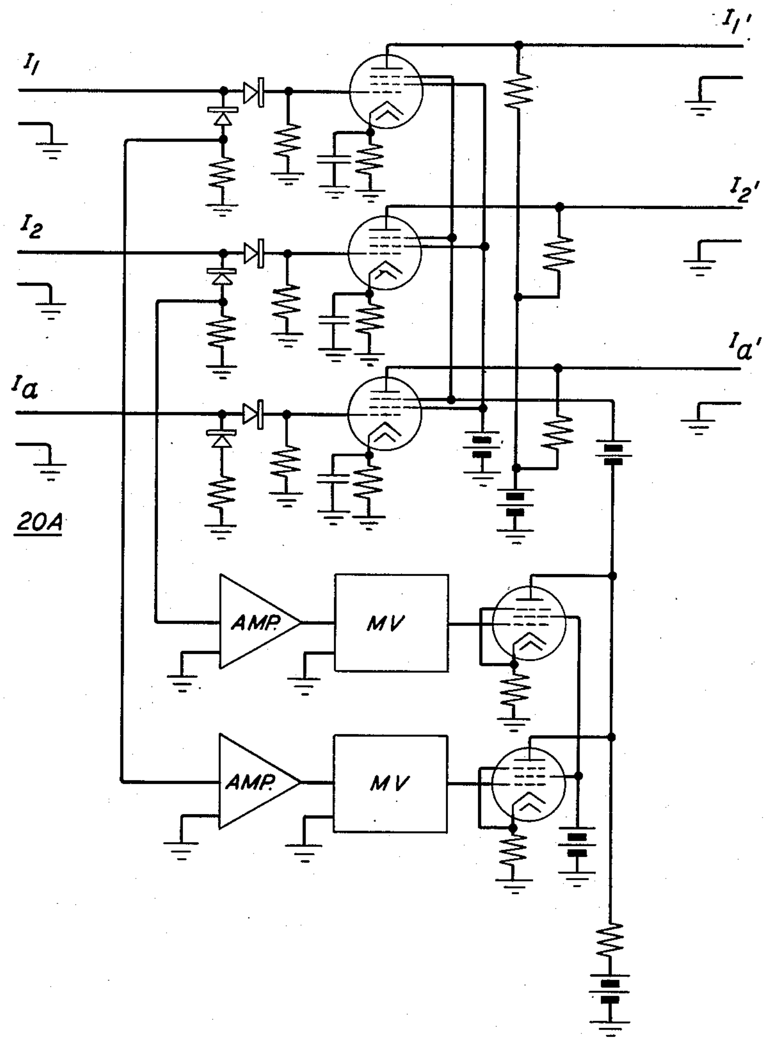

Fig. 5 shows an arrangement 20A similar in principle to that described for Fig. 4, which is adapted to select the appropriate set for the color match for colors falling either within a triangle formed by one composite and two fundamental primaries or outside all of the triangles formed. For such colors, it is unnecessary that the selecting means be controlled by the composite primary output, as is described hereinbefore with reference to the colors $C_2$ and $C_3$ of Fig. 3. Therefore, it is only necessary that the gating be controlled by the two fundamental or numbered outputs. The particular arrangement illustrated is that associated with the triangle 1—2—*a*. In principle, the operation is identical to that for the arrangement 20 shown in Fig. 4. In practice, only two control stages are necessary since the choice can be independent of the polarity of the composite primary output. Moreover, such an arrangement permits the optimum color match when the color to be reproduced is without all the triangles. An arrangement of this kind is combined with the ternary set of outputs of each color transformer associated with a triangle formed of one composite and two fundamental primaries illustrated in Fig. 3.

In this manner, all of the triangles formed in the illustration of Fig. 3 are associated with an appropriate disabling circuit, either of the kind shown in Fig. 4 or of that shown in Fig. 5. Since all the triangles are mutually exclusive, for any color there will be only one ternary set of color transformer outputs not disabled thereby.

Figure 6A:
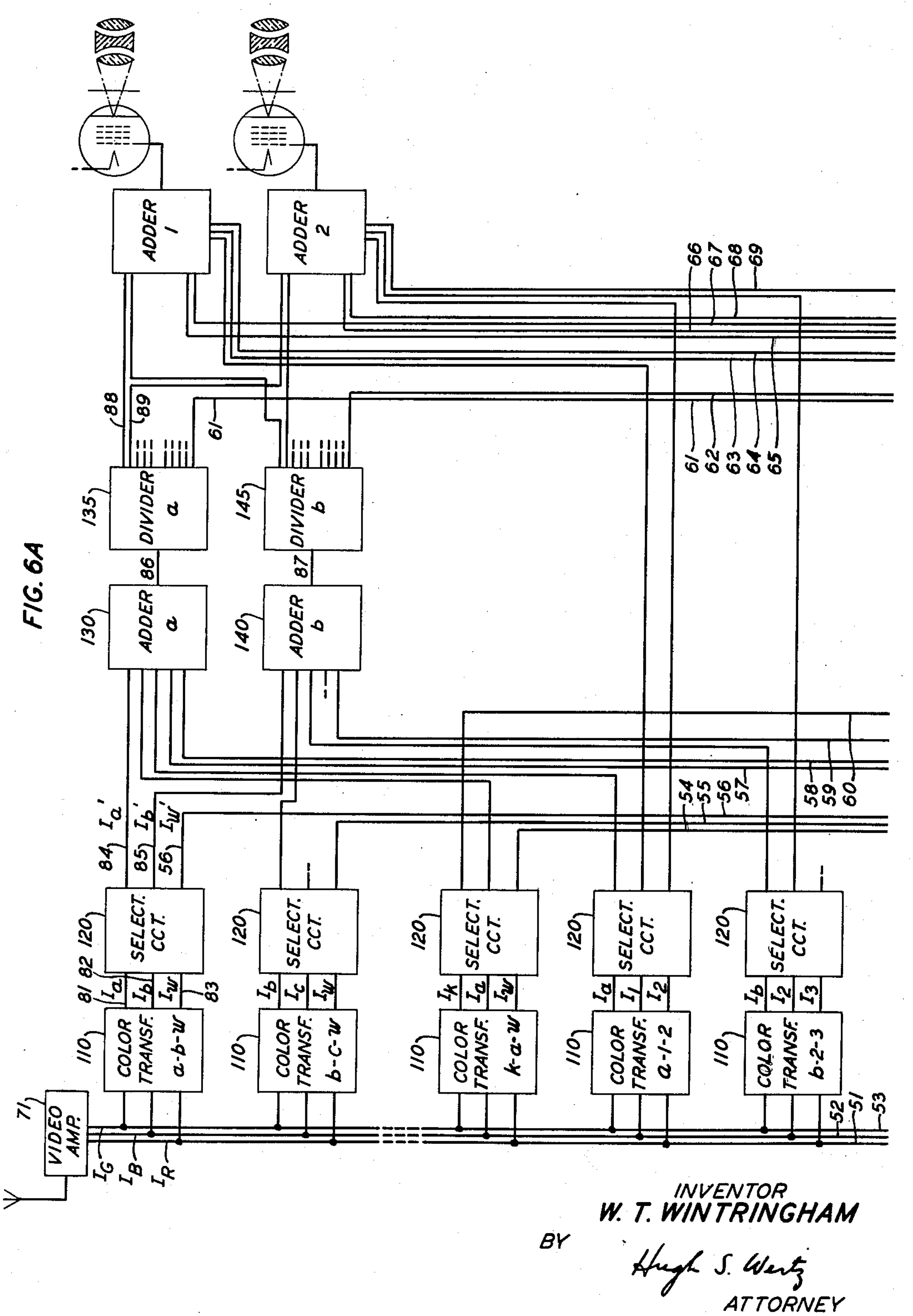
Figs. 6A and 6B show, in block diagram skeletonized form, a multicolor receiver in accordance with the invention.
Figure 6B:
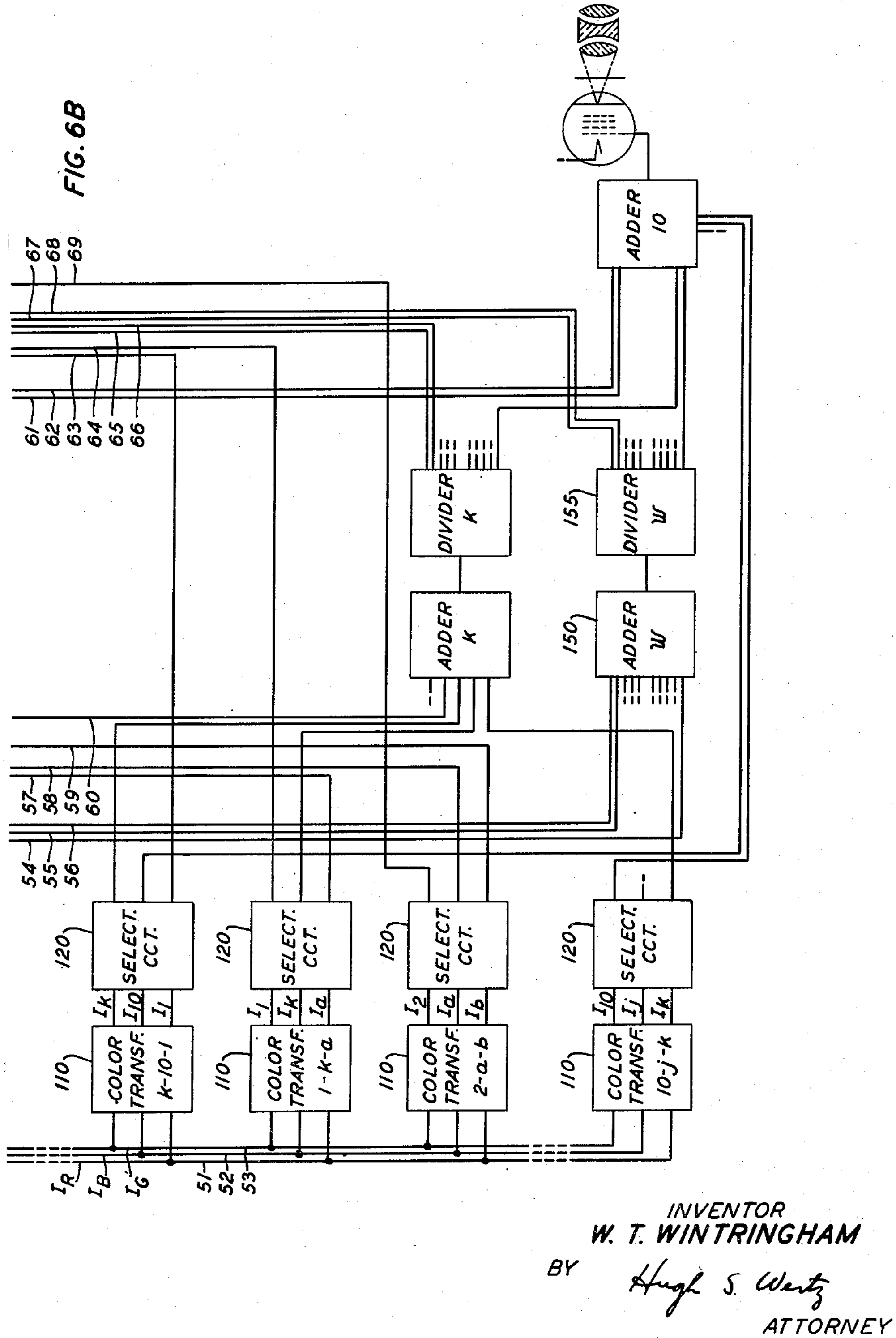

Figs. 6(A–B) illustrate, in a skeletonized block schematic form, a multicolor receiver in accordance with the invention, for ten carvings of the radiance distribution. The video amplifier 71 receives the transmitted video signals and separates therefrom the ternary set of color signals $I_R$, $I_G$, and $I_B$, representing the color to be matched and supplies them to each of the plurality of color transformers 110. There is a color transformer associated with each triangle formed, representing possible combinations of three primaries with which the color match is to be made. The primaries comprise both fundamentals of high saturation and composite primaries of low saturation including the white. The selected arrangement of grouping of primaries in triangles has been described hereinbefore with reference to Fig. 3. Associated with the ternary set of outputs of each of these color transformers are polarity sensitive selecting or disabling means. Suitable means therefore have been described with reference to Figs. 4 and 5. It is characteristic of this plurality of available color transformer outputs that the desired ternary set thereamong is the only one not rendered ineffective by its associated disabling circuit. The three separate outputs from each selecting circuit are supplied to corresponding adding circuits, an illustrative arrangement of which will be described with reference to Fig. 8. There is an adding circuit corresponding to each of the available primaries, and each adder is adapted to add the several outputs corresponding to its associated primary. The outputs of the adders associated with the composite primaries are, in turn, divided up in proportion to the amounts of fundamentals of which they are composed, and the various portions thereof are supplied to the adders of the corresponding fundamentals. For example, for a composite primary *a* of the kind described hereinbefore, the output of the *a* adder would be divided into portions comprising one part of fundamental 1, 0.8 part of fundamentals 2 and 10, 0.6 part of fundamentals 3 and 9, 0.4 part of fundamentals 4 and 8, and 0.2 part of fundamentals 5 and 7; the respective portions are supplied to the corresponding adders. Methods for dividing an output into a series of portions bearing an assigned relationship are well known in the electrical art. Thereafter, the output of each adder associated with a fundamental primary is supplied to the control element of an associated light source which is to supply the fundamental primary source. These light sources can consist of kinescopes or cathode-ray tubes adapted to transmit light of the desired characteristics by any of the methods known to the art, as, for example, by the use of filters.

With reference more specifically to Fig. 6, the wires 51, 52, and 53 supply the ternary set of color signals $I_R$, $I_B$, and $I_G$ to the color transformer 110, corresponding to the triangle *a—b—w*. The wires 81, 82, and 83, supply the ternary set of output signals therefrom, $I_a$, $I_b$, and $I_w$, to the selecting circuit 120. Thereafter, the wires 84, 85, and 56 supply the outputs therefrom $I_a'$, $I_b'$, and $I_w'$, to the *a*-adder 130, the *b*-adder 140, and the *w*-adder 150, respectively, and the outputs thereof are supplied to the *a*-divider 135, *b*-divider 145, and *w*-divider 155, respectively. After division, the various outputs are supplied to the corresponding fundamental adders therefor. Other color transformer output connections follow the same general pattern.

The color coordinate transformations described hereinbefore, can be carried out only when the three color signals corresponding to a signal color image are available simultaneously. The multicolor receivers of the present invention, therefore, can operate only from simultaneous color signals. If, for better transmission performance, it is desirable to transmit color signals sequentially, a conversion from sequential to simultaneous signals must be carried out at the receiver unit.

Figure 7:
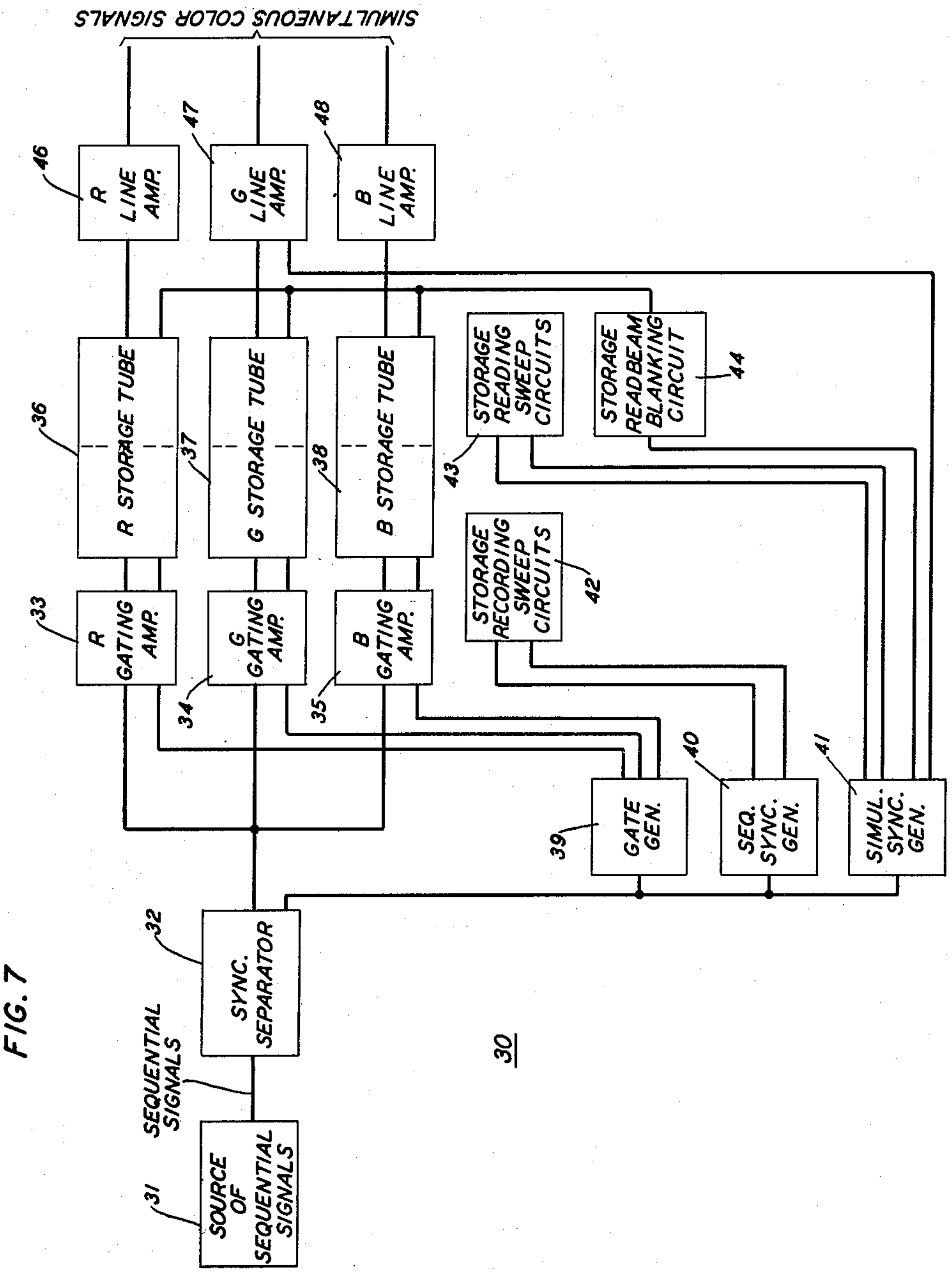
Fig. 7 shows an illustrative arrangement for converting sequential color signals to simultaneous ones which arrangement can be used to adopt the invention for use with sequential color signals.

Fig. 7 shows in block schematic form an illustrative arrangement 30 for converting sequential type signals into simultaneous signals for use with color coordinate transformers. Since in a sequential system the signals for each of the three primaries are transmitted cyclically at successive times, an obvious expedient for obtaining simultaneous signals therefrom is by introduction of delay. This is the technique used in the arrangement 30 where storing devices as, for example, storage tubes, are utilized to produce the necessary delay. A typical storage tube which can be adapted for use herefor, is described in the R. C. A. Review, volume IX, page 112 (1948), "Barrier Grid Storage Tube and Its Operation." The sequential signals, which for purposes of illustration will be described as composed of (A), (B), and (C) components, respectively, are supplied from a source 31, through the synchronizing separator 32 to three gating amplifiers 33, 34, and 35, associated with the (R), (G), and (B) output signal channels, respectively. These supply corresponding storage devices 36, 37, and 38, respectively, which are described as storage tubes, for example, the synchronizing separator 32 also furnishes necessary synchronizing pulses to the gating generator 39, the sequential synchronizing generator 40, and the simultaneous synchronizing generator 41. The gating generator 39 supplies the necessary gating pulses to the gating amplifiers 33, 34, and 35 so as to distribute the (R), (G), and (B) component signals to their corresponding storage devices 36, 37 and 38, respectively. The sequential synchronizing generator 40 furnishes the storage recording sweep circuits 42 with synchronizing pulses to insure the proper synchronization of the recording cycle of the storage process. Similarly the simultaneous synchronizing generator 41 drives the storage reading sweep circuits 43 to provide proper synchronization in the reading cycle, and also provides signals to the storage reading beam blanking circuit 44 which supplies blanking pulses to the reading beams of the storage devices 36, 37 and 38 to insure the simultaneity of the reading. Each of the storage devices 36, 37, and 38 is connected to its associated line amplifier 46, 47 and 48 corresponding to the (R), (G), and (B) components, respectively. The synchronizing pulses for the simultaneous set are supplied to the (G) component in its associated amplifier 47 from the simultaneous synchronizing generator 41. The three outputs of the amplifiers 46, 47 and 48 then represent simultaneous color signals which are facsimiles of the sequential signals after separation supplied from the source 31, and are now adaptable for utilization by color coordinate transformers in the manner hereinbefore described in accordance with the invention.

If the storage devices are storage tubes and are perfect in the sense that there is no interaction between the recording and reading, the simultaneous reading may occupy the same time that is required to write all three color signals sequentially. This means that the simultaneous field rate can be one-third the sequential field rate. If such perfection is not possible, the simultaneous reading rate must be about the same as the sequential recording rate, or the time required to read all the three simultaneous color signals must be approximately the time required to record one sequential color signal. This latter type of operation requires that the recorded signal be reread a total of three times from each record, before the record is erased. Alternatively, a system can be devised in which simultaneous color signals are available for one-third of the time, and during the remaining two-thirds no color information is available. Other arrangements for transformation from the sequential to simultaneous signals which will be apparent to workers skilled in the art, can be utilized.

Figure 8:
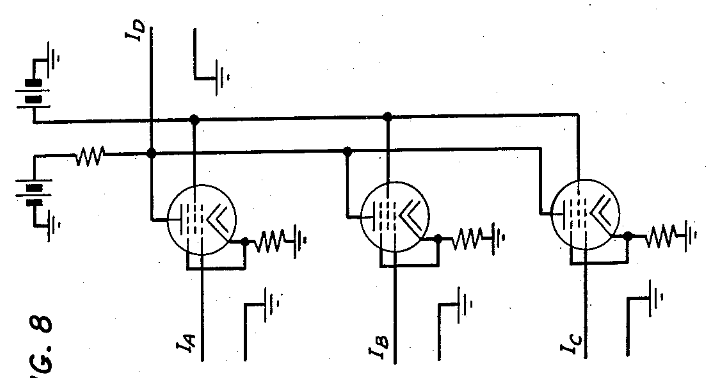
Fig. 8 shows diagrammatically an illustrative arrangement for adding outputs and which is useful in the practice of the invention.

Fig. 8 shows diagrammatically a simple illustrative adding circuit of the kind shown in block schematic in the arrangement of Figs. 6 (A–B) which can be utilized to add the several output corresponding to the same primary into a single signal for supplying the associated kinescope. The signals $I_1$, $I_2$ and $I_3$ to be added are supplied to the control grids of separate pentodes V20, V21, and V22 respectively, which are operated as conventional amplifiers. The outputs thereof are combined to form an output $I_4$ by means of a load resistor $R_{10}$ common to the plate circuits of tubes V20, V21, and V22. This arrangement is merely illustrative of the adding principle, additional refinements are necessary in a practical system.

It is to be understood that the above-described arrangements are illustrative of the principles of the invention. Numerous other arrangements can be devised by one skilled in the art without departing from the spirit and scope of the invention.

What is claimed is:

1. In a television receiver, means for receiving a ternary set of color signals representative of an object scene, a plurality exceeding three of light sources serving as fundamental primaries, means for combining in predetermined ratios light from at least two of said sources for forming a plurality of composite primaries, color coordinate transformers for transforming an input ternary set corresponding to an element of the object scene into a plurality of colorimetrically equivalent ternary sets, each of said equivalent sets controlling a different ternary combination of composite and fundamental primaries, electrical circuit means for selecting one from said ternary sets, and means utilizing said selected ternary set for actuating the sources controlled thereby.

2. In a television receiver, means for receiving an input ternary set of color signals representative of an object scene, a plurality exceeding three of light sources of fundamental primary colors, means for combining in predetermined ratios light from at least two of the sources of fundamental primary colors for forming composite primary colors, color coordinate transformers for transforming an input ternary set corresponding to an element of the object scene into a plurality of colorimetrically equivalent ternary sets, each of said equivalent sets controlling a different ternary combination of composite and fundamental primary colors, polarity sensitive circuit means supplied with the plurality of color coordinate transformer outputs for selecting therefrom one ternary set, and means utilizing said selected ternary set for actuating the sources controlled thereby.

3. In a television receiver adapted for receiving a ternary set of television signals representative of the chromaticity of elements of a color scene, an input source of a ternary set of signals, a plurality exceeding three of light sources of fundamental primary colors, means for combining in predetermined ratios light from at least two of said sources for forming composite primary colors, color coordinate transformers for transforming an input ternary set of signals corresponding to an element of the object scene into a plurality of colorimetrically equivalent ternary sets, each of said equivalent sets controlling a different ternary combination of said composite and fundamental primary colors such that, when the chromaticities of the various composite and fundamental primary colors are plotted on a chromaticity diagram, the figure having as vertices the chromaticities of the fundamental primary colors is divided into a plurality of triangles, each triangle having as vertices the chromaticities of the composite and fundamental primary colors which form the different ternary combinations, polarity sensitive electrical circuits for selecting the ternary set corresponding to the ternary combination of colors whose chromaticities form the vertices of a triangle which includes the chromaticity of the element of the object scene to be reproduced, and means for utilizing the selected ternary set for actuating the sources controlled thereby.

WILLIAM T. WINTRINGHAM.

References Cited in the file of this patent

UNITED STATES PATENTS

| Number | Name | Date |
|---|---|---|
| 2,415,051 | Thompson | Jan. 28, 1947 |
| 2,434,561 | Hardy | Jan. 13, 1948 |
| 2,492,826 | Valensi | Dec. 27, 1949 |